(12) United States Patent
Chen et al.

(10) Patent No.: US 7,836,441 B2
(45) Date of Patent: Nov. 16, 2010

(54) ADMINISTRATION AUTOMATION IN APPLICATION SERVERS

(75) Inventors: Yen-Fu Chen, Austin, TX (US); Cliff D. Cyphers, Pflugerville, TX (US); Angel E. Tomala-Reyes, Flushing, NY (US); Keith R. Walker, Austin, TX (US); Sarah V. White Eagle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1313 days.

(21) Appl. No.: 11/352,700

(22) Filed: Feb. 13, 2006

(65) Prior Publication Data

US 2007/0240144 A1 Oct. 11, 2007

(51) Int. Cl.
*G06F 9/44* (2006.01)
(52) U.S. Cl. .................................... 717/168
(58) Field of Classification Search ......... 717/100–101, 717/141–169; 709/200
See application file for complete search history.

(56) References Cited

U.S. PATENT DOCUMENTS

| | | | |
|---|---|---|---|
| 6,799,195 | B1 | 9/2004 | Thibault et al. |
| 6,816,905 | B1 | 11/2004 | Sheets et al. |
| 6,859,882 | B2 | 2/2005 | Fung |
| 6,973,647 | B2* | 12/2005 | Crudele et al. ............... 717/177 |
| 6,993,763 | B2* | 1/2006 | Hayes, Jr. .................... 718/102 |
| 7,206,817 | B2* | 4/2007 | Fanshier et al. ............. 709/208 |
| 7,228,326 | B2* | 6/2007 | Srinivasan et al. .......... 709/200 |
| 7,412,497 | B2* | 8/2008 | Viswanath et al. .......... 709/220 |
| 2003/0188208 | A1 | 10/2003 | Fung |
| 2003/0225851 | A1* | 12/2003 | Fanshier et al. ............. 709/208 |
| 2004/0019663 | A1* | 1/2004 | Viswanath et al. .......... 709/220 |
| 2004/0230973 | A1 | 11/2004 | Cundiff et al. |
| 2005/0267918 | A1* | 12/2005 | Gatev et al. ................... 707/203 |
| 2005/0289536 | A1* | 12/2005 | Nayak et al. ................. 717/174 |

(Continued)

FOREIGN PATENT DOCUMENTS

EP 0509945 A 10/1992

(Continued)

OTHER PUBLICATIONS

IBM Tivoli Intelligent Orchestrator and Tivoli Provisioning Manager Operator's Guide. IBM Corp. 2003.*

(Continued)

*Primary Examiner*—Anna Deng
(74) *Attorney, Agent, or Firm*—Yee & Associates, P.C.; William H. Steinberg; Rudolf O. Siegesmund

(57) ABSTRACT

An application server administration framework (ASAF) minimizes the number of manual steps during the installation or modification processes by allowing a user to accomplish the installation or modification by entering values in a property file. A deployment script is invoked that identifies changes in the property files, and invokes appropriate procedures from a procedure script. The procedure script links the property file to one or more component scripts so that the values entered by the administrator are populated to the appropriate component scripts. When the values have been populated to the appropriate component scripts, the deployment script invokes the scripting engine which runs the scripts to make the necessary changes to the configuration files for the application server.

11 Claims, 9 Drawing Sheets

U.S. PATENT DOCUMENTS

| | | | |
|---|---|---|---|
| 2006/0010434 A1* | 1/2006 | Herzog et al. | 717/168 |
| 2006/0029054 A1 | 2/2006 | Breh et al. | |
| 2006/0053094 A1* | 3/2006 | Ravi et al. | 707/3 |
| 2006/0111880 A1* | 5/2006 | Brown et al. | 703/1 |
| 2006/0136897 A1* | 6/2006 | Laxminarayan et al. | 717/168 |
| 2007/0006209 A1* | 1/2007 | Nguyen et al. | 717/168 |

FOREIGN PATENT DOCUMENTS

| | | |
|---|---|---|
| EP | 1376929 A | 2/2004 |

OTHER PUBLICATIONS

IBM WebSphere Application Server V5.1 System Management and Configuration. pp. 1-300 IBM.com/redbook. Apr. 2004.*

Willenborg, Brown and Cuomo, "Designing WebSphere Application Server for Performance: An Evolutionary Approach," IBM Systems Journal, 2004, pp. 327-350, vol. 43, No. 2.

* cited by examiner

ADMINISTRATION AUTOMATION IN APPLICATION SERVERS

FIELD OF THE INVENTION

The present invention relates to data processing in general, and to automated deployment of applications to application servers in particular.

BACKGROUND OF THE INVENTION

Application servers, such as IBM's WebSphere Application Server®, (WAS) support the deployment and management of Web applications ranging from simple Web sites to powerful e-business solutions. In the case of IBM's WebSphere Application Server®, the platform is a Java 2 Platform, Enterprise Edition (J2EE®) Web application server, similar to other application servers, such as BEA WebLogic® Server and Oracle Application Server.

WAS provides the application logic enabling client components to interact with data resources and legacy applications. WAS also collaborates with the Web Server by exchanging client requests and application responses. An administrator can define multiple Application Servers where each would be running in its own Java Virtual Machine (JVM).

Within application servers such as WAS, the application server configuration provides information for starting and managing a server process to handle requests for enterprise applications and their components. WAS uses an administrative console to guide a user through deployment and system administration tasks. Actions taken by the user in the console modify a set of XML configuration files. Administrators can use the console to perform such tasks as adding, deleting, and stopping application servers, deploying new applications to a server, starting and stopping existing applications, and modifying certain configurations. In addition, administrators can use the console to manage variable, shared libraries, database connections, and other configurations that can span multiple application servers, configure product security, and collect data for performance and troubleshooting purposes.

Existing tools offer ways to administer and manage application server tasks without the need for the graphical user interface of the administrative console. Java Command Language (Jacl) is designed to be a universal scripting language for Java. A Jacl interpreter is written completely in Java and can run on any Java Virtual Machine (JVM). Jacl can be used to create Web content or to control Java applications. WAS contains a utility, wsadmin, that implements and extends the base Jacl interpreter allowing an administrator to make additions, changes, or modifications to the server configuration.

In the on-demand service environment, many of the application server administration operations (making additions, changes or modifications to the server configuration) require manual, time consuming steps. Moreover, operations require a dedicated administrator with a specific skill set to perform the tasks when that administrator's skills could be applied to additional responsibilities. For example, to execute a task such as "installing an application," an administrator must be trained in the existing tool so that he or she understand the controls, becomes familiar with navigation and can follow a series of steps to achieve deploying an Enterprise Archive (EAR) file and start the application. Any small mistake in the detailed process (such as a missed check box or incorrect database version from the installation panel) can cause the installation to fail. In order to enable an application to connect to a database, the administrator would be required to launch the administrative console, login, click the security link in the navigation, and work with such properties as credentials, descriptions, variable entries pointing to the resource provider classes, resource links in the navigation, datasources, database names, connection pool information, and others.

Therefore, a need exists for a tool to automate complex, manual administrative steps in an application server and thereby minimize the time and training required to execute tasks.

SUMMARY OF THE INVENTION

The invention that meets the need identified above is an application server administration framework (ASAF) that minimizes the number of manual steps during the installation or modification processes by allowing a user to accomplish the installation or modification by entering values in a property file.

The set up program allows a user to enter data directly into the property files based upon the administrative tasks required. Alternatively, a graphical user interface may be provided so that the user can be prompted to enter data, rather than entering the data directly into the property file.

The deployment script is invoked by an event trigger. An event trigger may be invoked by a manual user selection, a scheduled event, a graphical user interface, or by an external automation process such as Tivoli Intelligent Orchestrator™. When invoked, the deployment script identifies changes in the property files, and invokes appropriate procedures from a procedure script. In addition, the deployment script invokes an error program that performs environmental setting checks, monitors the process, and conducts a final error check. The environmental setting checks involve determining whether the appropriate permissions have been granted, the appropriate paths properly defined, EAR files properly deployed, and other required configurations set. The procedure script links the property file to one or more component scripts so that the values entered by the administrator are populated to the appropriate component scripts. When the values have been populated to the appropriate component scripts, the deployment script invokes the scripting engine which runs the scripts to make the necessary changes to the configuration files for the application server.

An error detection program performs environmental checks, monitors logs throughout the process, and performs a final check. The error detection program identifies errors and accesses a policy script to automatically fix errors in the implementation process.

The policy script provides rules to prevent or cure error by controlling the sequence and order of operations, automatically starting or restarting an application or server when necessary, and including other actions that the component script may not know is required. For example, even if a developer or user implements a component script using an improper order of events (as allowed by the application server), the error detection program will discover the error, access the policy script, and either proceed with the correct order or notify the user.

A simulation program allows operations to be tested on secondary systems to ensure that the change can be successfully executed.

BRIEF DESCRIPTION OF DRAWINGS

The novel features believed characteristic of the ASAF are set forth in the appended claims. The ASAF itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the ASAF are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. As used herein, a computer program is compiled, immutable and executable by itself. As used herein, a "script" is an uncompiled and mutable text file that is invoked by a program, but that is not executable by itself. As used herein, "environment" means the operating system and any related middleware or software upon which a particular web server application depends. Thus, the functions of the ASAF may be distributed among a plurality of computers, computer programs, and scripts.

Figures 1, 2A:
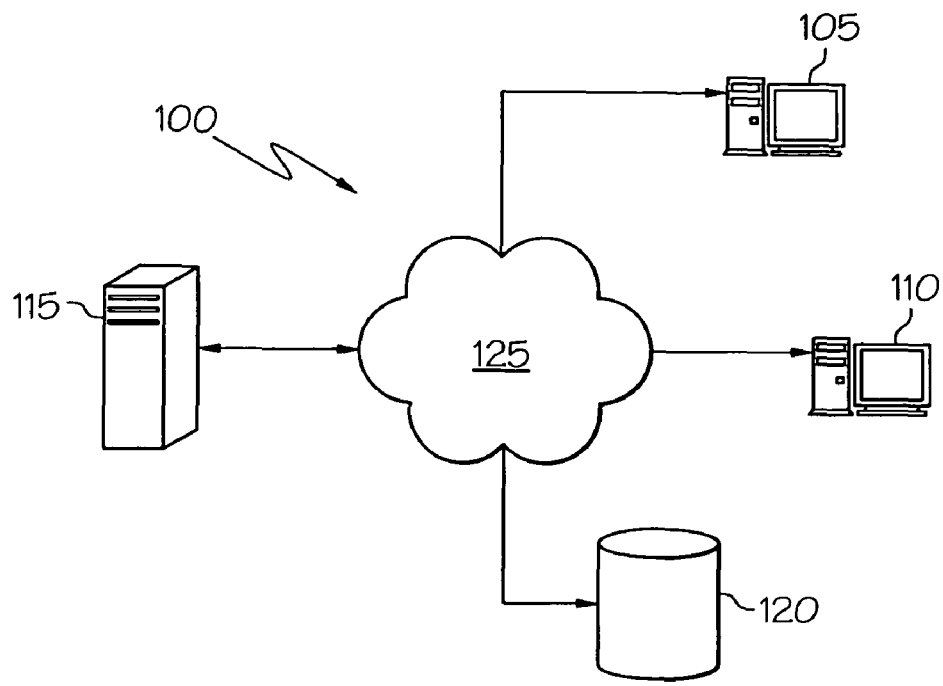
FIG. 1 depicts an illustration of a system in which the application ration framework may be employed.
FIG. 2A depicts an exemplary first memory containing the programs and the invention.

Additionally, the ASAF is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2B:
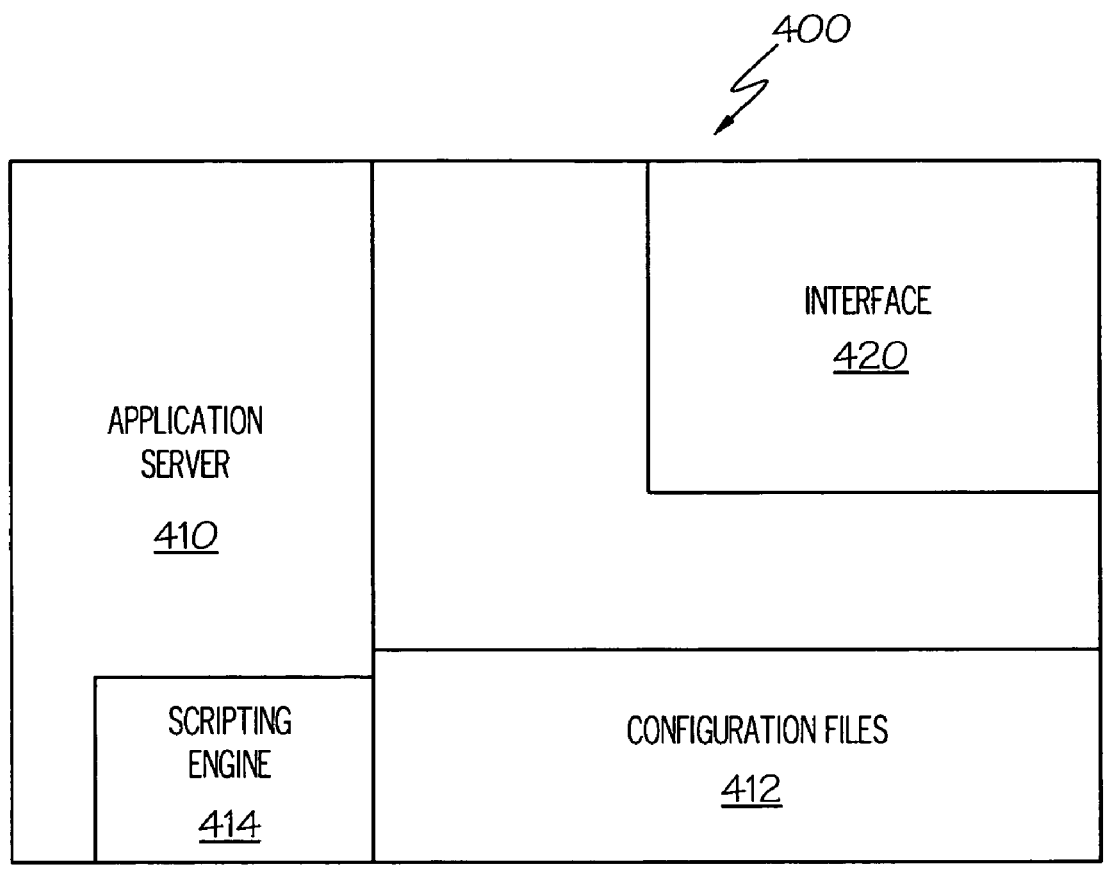
FIG. 2B depicts an exemplary second memory containing the programs of a web application server.

ASAF 210 typically is stored in a memory, represented schematically as memory 200 in FIG. 2A. The term "memory," as used herein, includes without limitation any volatile or persistent medium, such as an electrical circuit, magnetic disk, or optical disk, in which a computer can store data or software for any duration. A single memory may encompass and be distributed across a plurality of media. Thus, FIG. 2 is included merely as a descriptive expedient and does not necessarily reflect any particular physical embodiment of memory 200. As depicted in FIG. 2, though, memory 200 includes templates 295, property files 250, deployment script 220, procedure script 230, component scripts 240, error detection program 260, set up program 280, and policy script 270. Optionally, memory 200 contains simulation program 290. FIG. 2B depicts second memory 400 containing application server program 410, scripting engine 414, interface program 420 and configuration files 412 for the application server (such as server 115 in FIG. 1). A "scripting engine" resides within the application server and executes scripts when invoked. A "policy script" is a script that checks other scripts for syntax and for adherence to applicable rules. A "deployment script" is a script that invokes and manages the ASAF process. A "procedure script" includes procedures that combine complex tasks. A "component script" instructs ASAF which procedures will be carried out when the deployment script runs. A "template" is a sample component script that a developer can modify for a particular component of an application. A "property file" is a text file that contains properties needed by a component script or a procedure script.

An on-demand operating environment is based upon the concepts of a service oriented architecture (SOA). In an SOA, every application or resource is modeled as a service that implements a specific, identifiable function (or set of functions). In an on-demand environment, the services often implement specific business functions, but also may implement interfaces or other operating functions.

Services in SOAs communicate with each other by exchanging structured information, typically through messages or documents. The services' capabilities are defined by interfaces declaring messages they can produce or consume, policy annotations declaring a quality of service required or provided, and choreography annotations declaring behavioral constraints that must be respected in service interactions. The actual implementation of any specific service is hidden from the service requester, which allows new and existing applications to be quickly combined into new contexts.

Figure 3:
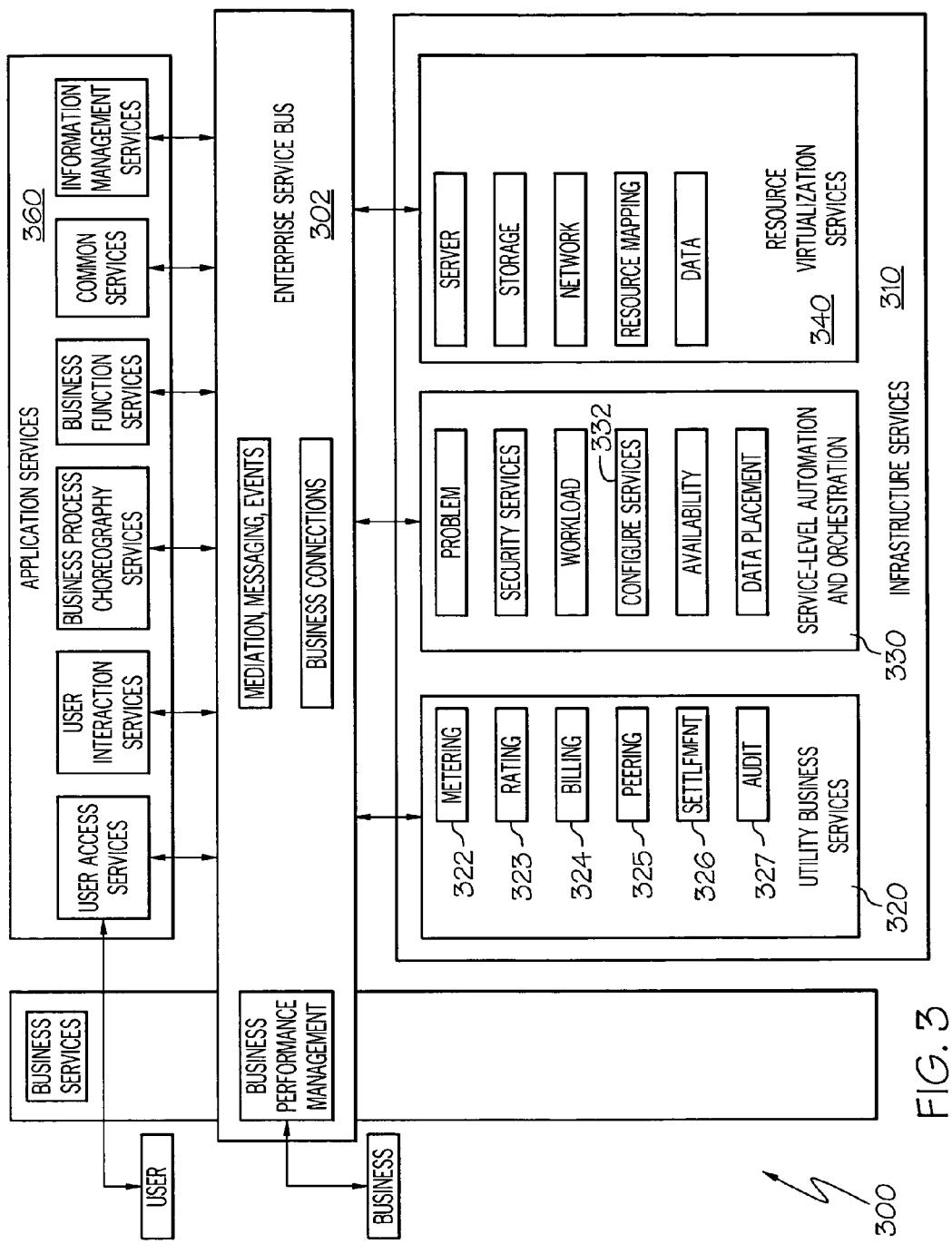
FIG. 3 depicts an illustration of a service oriented architecture.

FIG. 3 provides an overview of SOA 300. At the system level, components of the environment are system objects such as servers, storage, and data. At the application level, components are dynamically integrated application modules that constitute sophisticated, yet much more flexible applications. At the business level, the components are business objects, defined for particular vertical industries or more generally, as they apply horizontally across industries.

Typically, a specific on-demand business service relies on many other services in its implementation. All interactions between services flow through an Enterprise Service Bus (ESB) such as ESB 302. ESB 302 facilitates mediated interactions between service end points. ESB 302 supports event-based interactions, as well as message exchange for service request handling. For both events and messages, mediations can facilitate interactions by, for example, locating services that provide requested capabilities, or by handling interface mismatches between requesters and providers that are compatible in terms of their capabilities. ASAF 210 is suitable for inclusion with Infrastructure Services 310 and Configure Services 332.

Figure 4:
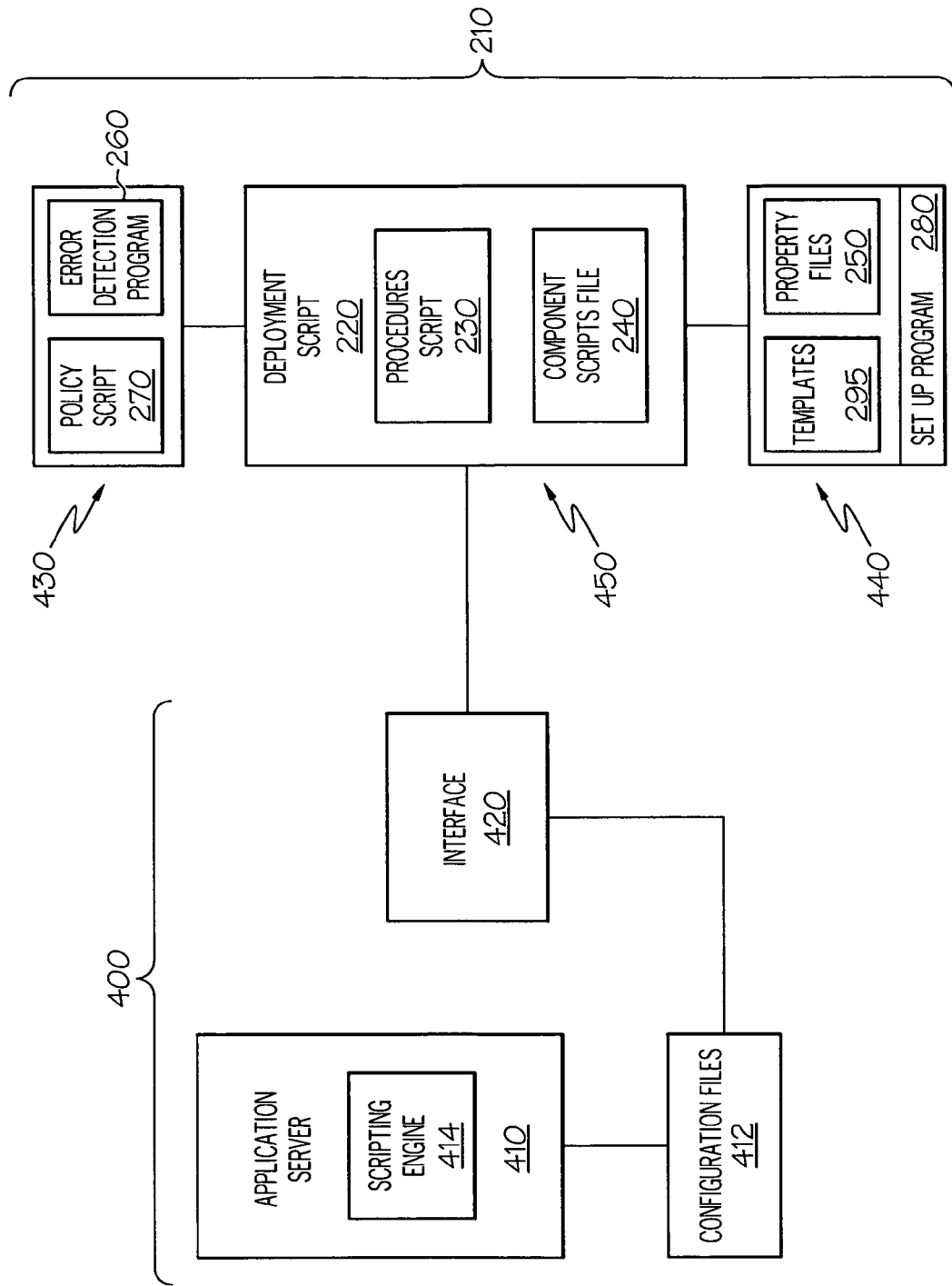
FIG. 4 depicts a diagram of a system in which the invention is employed.

FIG. 4 depicts web application administration system 400 showing the relationship of ASAF 210 to web application server 410. Web application server 410 is connected to configuration files 412. Interface 420 is connected to configuration files 412 and deployment script 220. ASAF 210 has error detection element 430, set up element 440, and automation engine 450. Error detection element 430 has error detection program 260 and policy script 270. Set up element 440 has property files 250 and templates 295. Automation engine 450 has deployment program 220, procedures script 230, and component scripts 240.

Figure 5:
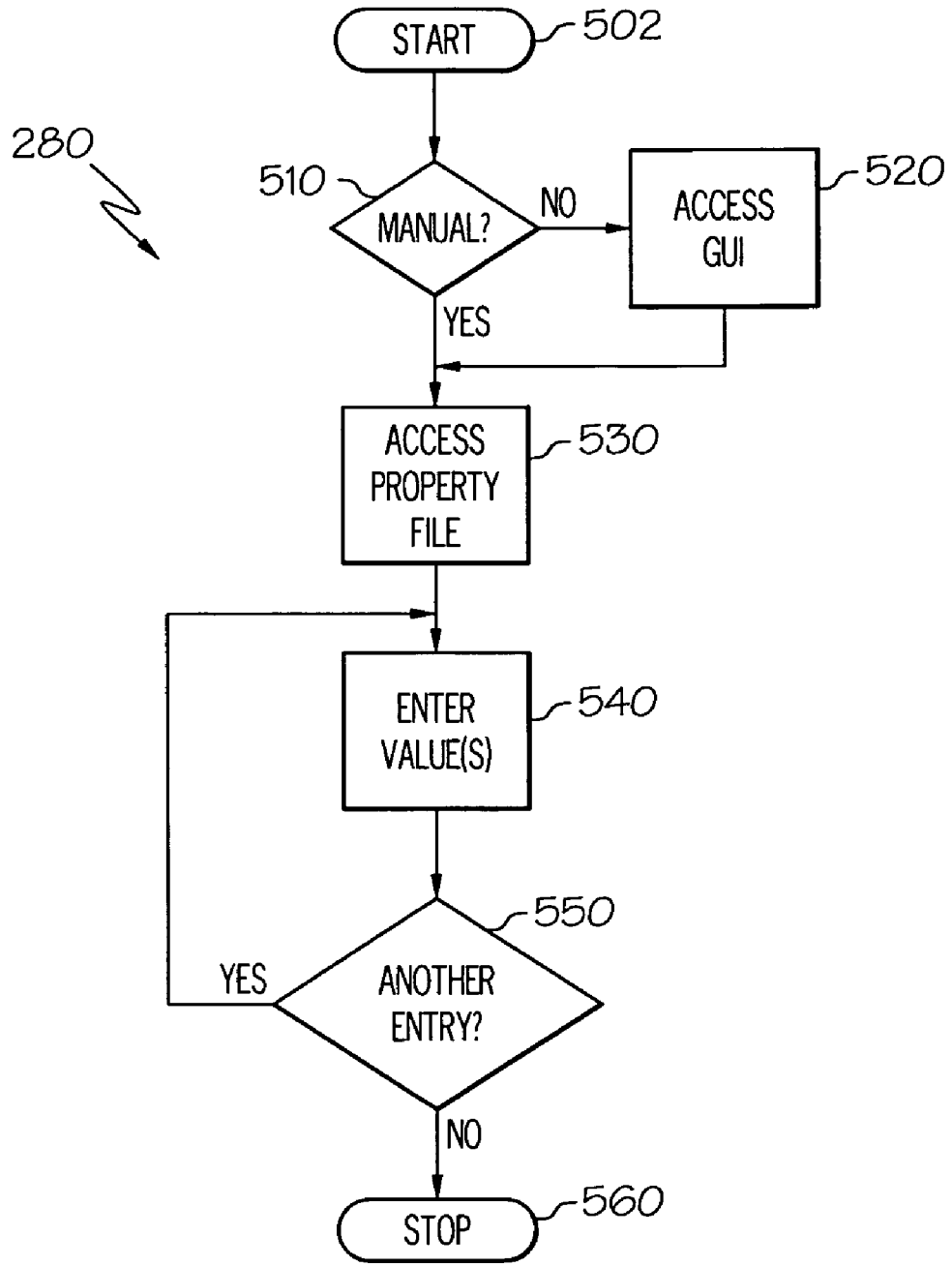
FIG. 5 depicts a flow chart of the set up program.

FIG. 5 depicts a flowchart of set up program 280. Set up program 280 begins (502) when a user desires to access property files 250 (see FIG. 2 and FIG. 4). A determination is made whether manual entry or a graphical user interface will be used (510). The user enters the values for the operation required (540). If another entry is to be made, set up program 280 goes to step 550, and if not, stops (560). Persons skilled in the art will realize that, for the property files and for the graphical user interface, the structure, presentation, optional contextual help information, and available tasks can be determined by various levels of developers and users.

Figure 6:
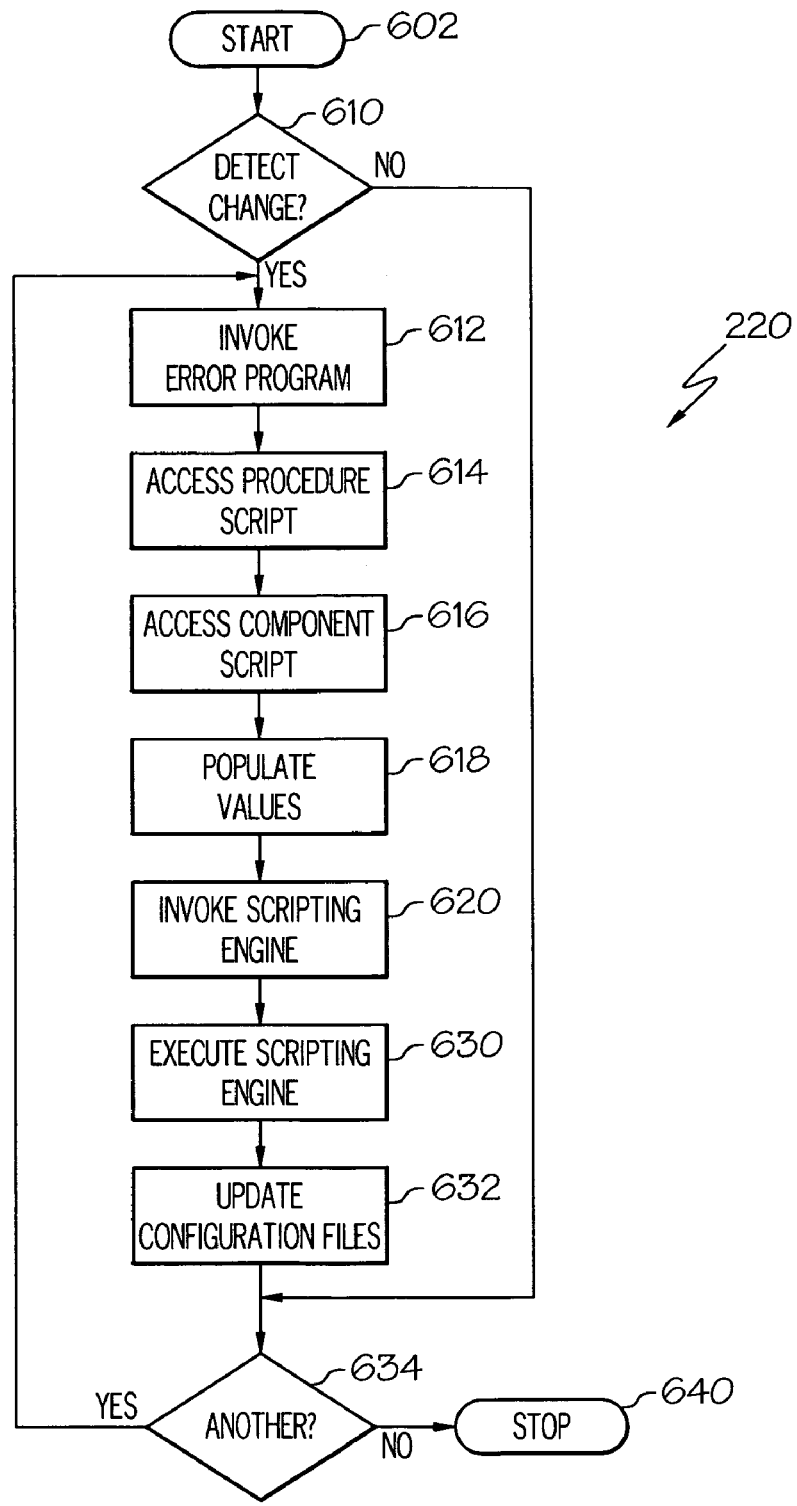
FIG. 6 depicts a flow chart of the deployment script.

FIG. 6 depicts a flow chart for deployment script 220. Deployment script 220 starts upon a manual initiation or a scheduled initiation (602), and determines whether a change has been detected in one of the property files (610). If no change is detected, deployment program 220 goes to step 634. If a change has been detected, deployment script 220 invokes error detection program 260 (612), and then accesses a procedure from procedure script 230 (614). The particular procedures accessed will be determined by the nature of the change detected and the procedures called for in the property file. The procedure accessed will link the property file where the change was detected to a component script (616). Deployment script 220 populates the changed value from the property file to the component script (618), invokes scripting engine 414 (620), executes scripting engine 414 (630), and updates configuration files 412 for application server 410 (see FIG. 4) (632). A determination is made whether another change has been detected (634). If so, deployment script 280 goes to step 612, and if not, stops (640).

Figure 7:
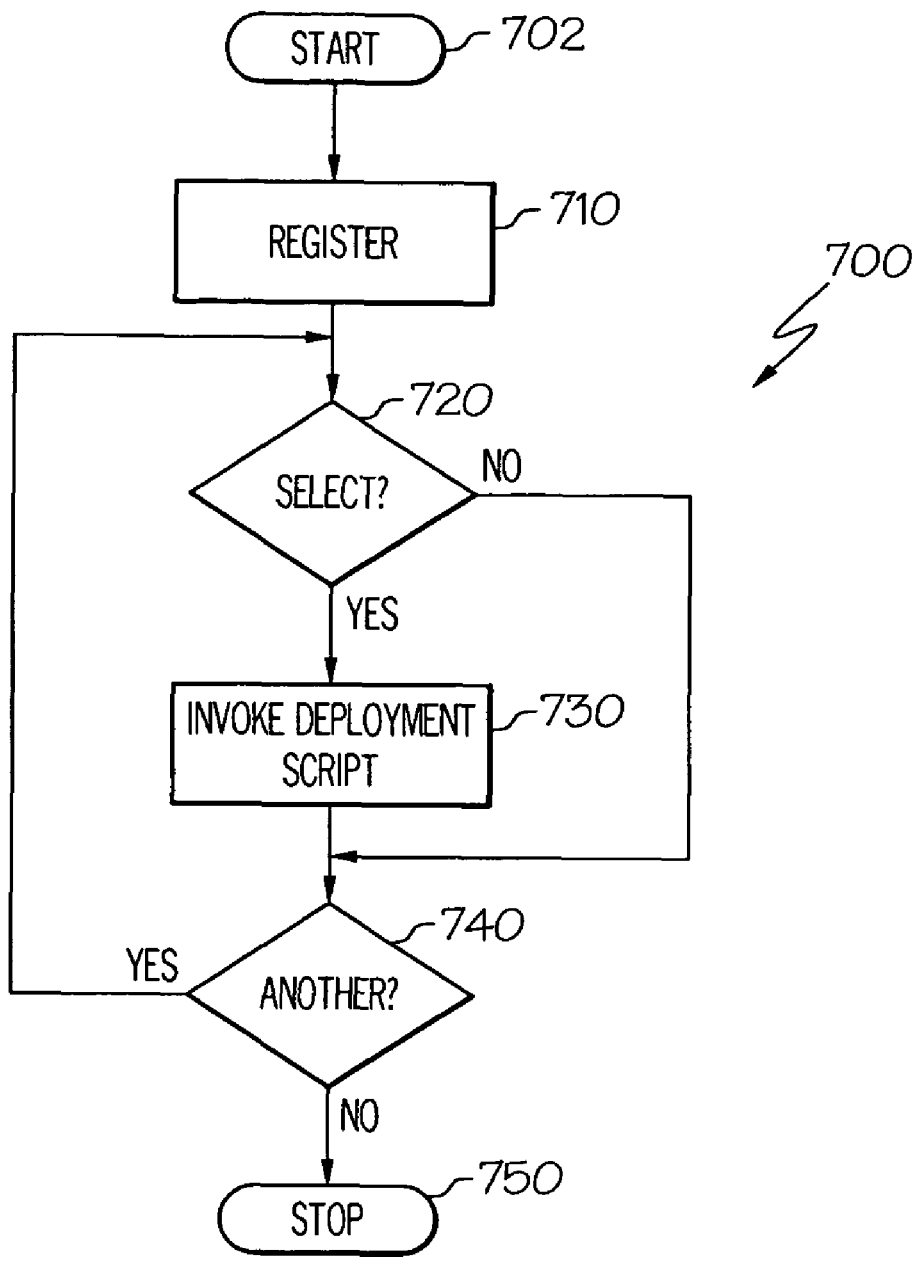
FIG. 7 depicts a flow chart of the registration program.

FIG. 7 depicts a flow chart of registration program 700. Registration program 700 begins when an application server contacts the server containing ASAF 210. The application server registers (710) and selects whether or not to use ASAF 210 (720). If selected, deployment script 220 is invoked (730). A determination is made whether another application selection is to be made (740). If not, service interface ends (750). ASAF 210 may be registered for use with Infrastructure Services 310 and Configure Services 332 (see FIG. 3).

Figure 8:
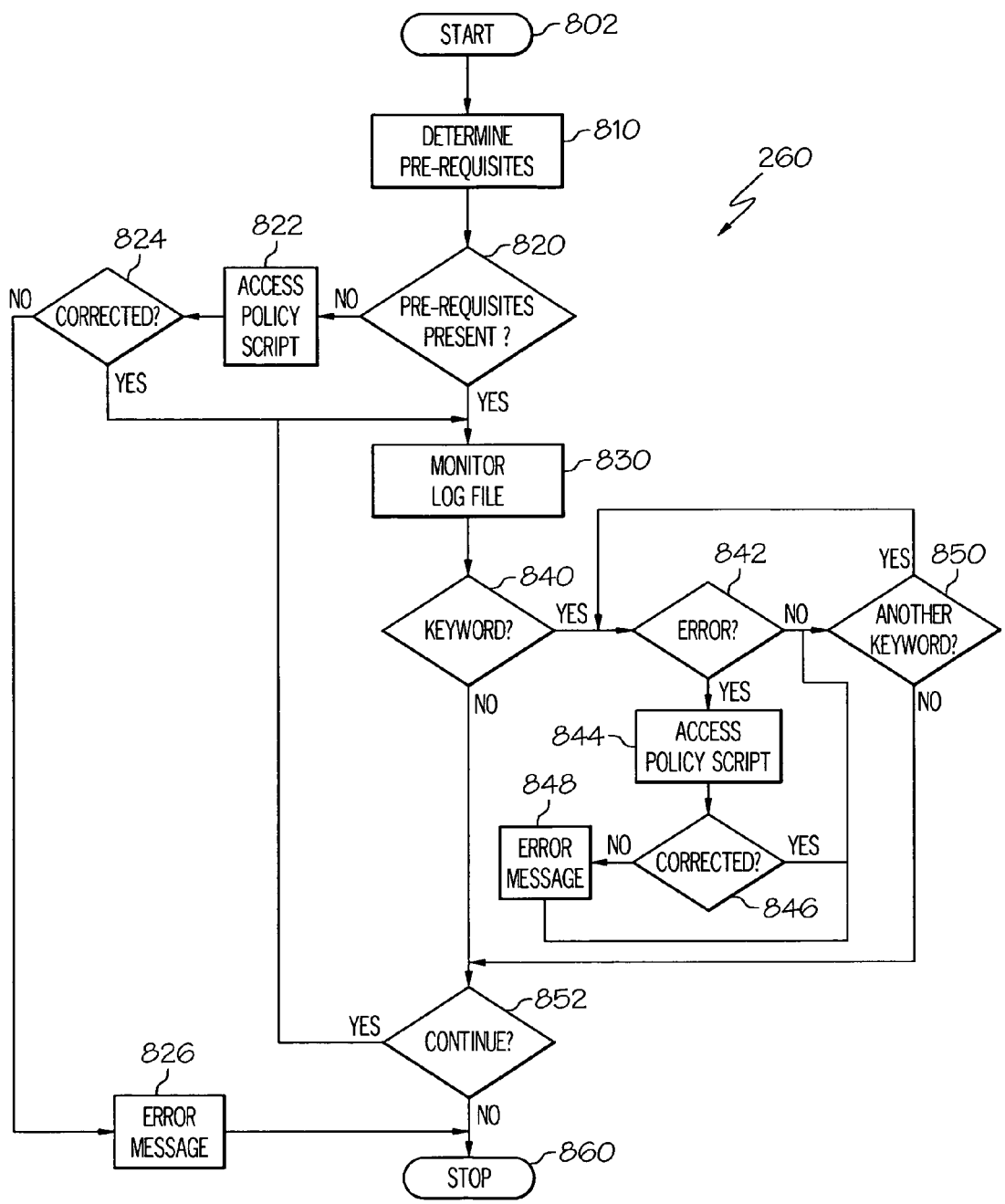
FIG. 8 depicts a flow chart of the error detection program.

FIG. 8 depicts a flow chart of error detection program 260. Error detection program 260 begins (802), determines the necessary pre-requisites (810), and then determines whether the necessary pre-requisites are present (820). If not, error detection program accesses policy script (822), and error detection program 260 determines whether the error has been corrected (824). If not, an error message is displayed (826). If the error is corrected, or if the pre-requisites were present, error detection program 260 monitors the log file (830). Error detection program 260 determines whether a key word is present in the log file (840). If so, a determination is made whether the key word indicates an error (842). If an error is found, error detection program 260 accesses the policy script (844), and determines whether the error has been corrected (846). If not, an error message is displayed (848). If at step 842 no error was found, or if at step 846 the error was corrected, then a determination is made whether there is another key word (850). If so, error detection program goes to step 842, and if not, goes to step 852. If at step 840, no keywords were found, or if at step 850 there are no more keywords, then a determination is made whether to continue (852). If so, error detection program 260 goes to step 830, and if not, stops (860).

Figure 9:
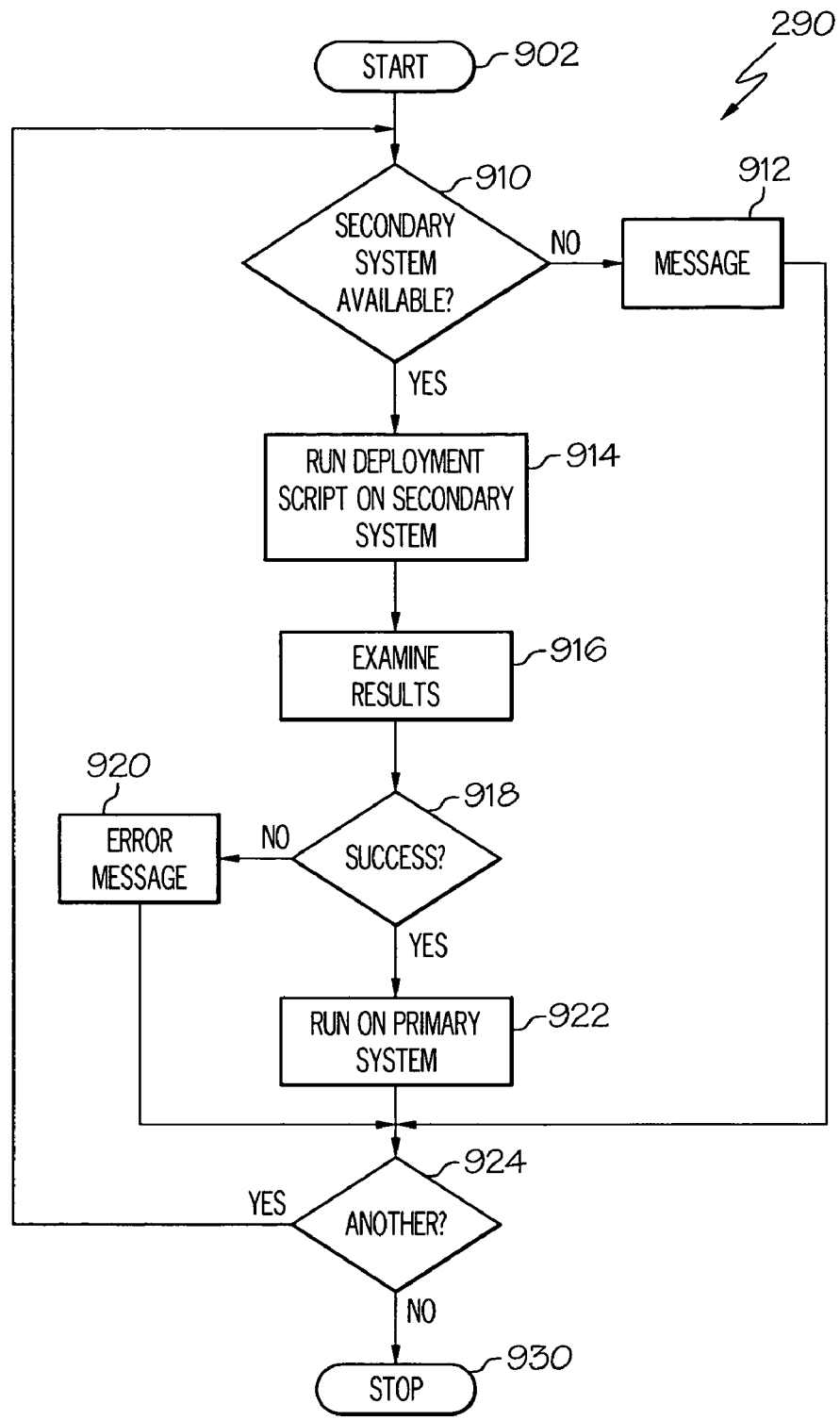
FIG. 9 depicts a flow chart of the simulation program.

FIG. 9 depicts a flow chart of simulation program 290. Simulation program 290 starts (902) and determines whether a secondary system is available (910). If not, a message is displayed (912), and simulation program 290 goes to step 924. If a secondary system is available, then deployment script 220 (see FIG. 6) is run on the secondary system (914), and the results are examined (916). A determination is made whether the deployment script ran successfully (918). If not, an error message is displayed (920), and if so, the deployment script is run on the primary system (922). Simulation program 290 determines whether there is another deployment to simulate (924), and, if so, returns to step 910, or if not, stops (930).

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed:

1. An apparatus for automated application server administration framework comprising:
    an application server connected to a primary system by a network and having a plurality of configuration files and a scripting engine in a first memory;
    a computer connected to the application server by a network and having, in a second memory, a property file, a deployment script, a procedure script, a component script in a second memory and a property file containing a plurality of values needed by the component script;
    wherein the deployment script, responsive to identifying a change in the property file, invokes the procedure script to link the property file in which the change was detected, to the component script so that the change in the property file is populated to the component script; and
    wherein, responsive to the change in the property file being populated to the component script, the deployment script invokes the scripting engine to make a plurality of changes to a configuration file of the application server;
    wherein the deployment script invokes an error program that performs a plurality of environmental setting checks, monitors the installation or the modification process, and conducts a final error check, wherein the plurality of environmental setting checks determine whether a plurality of appropriate permissions have been granted, whether a plurality of appropriate paths have been properly defined, and a plurality of enterprise archive files properly deployed, and responsive to identifying a plurality of errors, the error program accesses a policy script to automatically fix the plurality of errors.

2. The apparatus of claim 1 further comprising:
    wherein the deployment script is invoked by an external automation process; and
    wherein an entry of values into the property file is the only manual operation required to accomplish an installation or modification process on the application server by the automated application server administration framework.

3. The apparatus of claim 2 wherein the external automation process is Tivoli Intelligent Orchestrator™.

4. The apparatus of claim 1 further comprising a simulation program that runs the deployment script on a secondary system.

5. The apparatus of claim 1 further comprising a policy script that checks other scripts for syntax and for adherence to rules; wherein the policy script is invoked by the error program.

6. A service method offered in a service oriented architecture comprising:

providing a computer connected to an application server in a service oriented architecture network;

identifying a change in a property file containing a plurality of values needed by a component script;

populating the change in the property file to a component script;

responsive to the change in the property file being populated to the component script, a scripting engine in an application server, wherein a change corresponding to the change in the property file is made to a configuration file of the application server invoking, by a deployment script, an error program that performs a plurality of environmental setting checks, monitors the installation or the modification process, and conducts a final error check;

determining, by the plurality of environmental setting checks, whether a plurality of appropriate permissions have been granted, whether a plurality of appropriate paths have been properly defined, and whether a plurality of enterprise archive files have been properly deployed;

responsive to identifying a plurality of errors, accessing, by the error program, a policy script to automatically fix the plurality of errors.

7. The service method of claim 6 further comprising:

invoking, by an external automation process, the deployment script, wherein an entry of values into the property file is the only manual operation required to accomplish an installation or modification process on the application server by the automated application server administration framework.

8. The service method of claim 7 wherein the external automation process is Tivoli Intelligent Orchestrator™.

9. The service method of claim 6 further comprising running the deployment script on a secondary system.

10. The service method of claim 6 further comprising checking other scripts for syntax and for adherence to rules.

11. A computer program product comprising:

A non-transitory computer readable storage medium;

first program instructions for identifying a change in a property file containing a plurality of values needed by a component script;

second program instructions for populating the change in the property file to a component script and, responsive to the change in the property file being populated to the component script;

third program instructions for invoking a scripting engine in an application server, wherein a change corresponding to the change in the property file is made to a configuration file of the application server;

fourth program instructions for accessing a policy script to automatically fix a plurality of errors in the installation or the modification process, the plurality of errors identified by determining whether an appropriate permission has been granted;

fifth program instructions for determining whether paths are properly defined; and sixth program instructions for determining whether an enterprise archive file is properly deployed;

wherein the first, second , third, fourth, fifth and sixth program instructions are stored on the non-transitory computer readable storage medium.

* * * * *